United States Patent [19]

Leibfred et al.

[11] Patent Number: 5,595,774
[45] Date of Patent: Jan. 21, 1997

[54] REDUCED FAT SHREDDED WAFERS AND PROCESS

[75] Inventors: Kevin J. Leibfred, Towaco, N.J.; Diane L. Hnat, Danbury, Conn.; Angel D. Ferrer, Patterson; Henry M. Andreski, Whippany, both of N.J.

[73] Assignee: Nabisco, Inc., Parsippany, N.J.

[21] Appl. No.: 355,582

[22] Filed: Dec. 14, 1994

[51] Int. Cl.⁶ .................................................. A23L 1/168
[52] U.S. Cl. .............. 426/93; 426/309; 426/620
[58] Field of Search ......................... 426/93, 309, 620

[56] References Cited

U.S. PATENT DOCUMENTS

| | | |
|---|---|---|
| 502,378 | 8/1893 | Perky et al. . |
| 713,795 | 11/1902 | Perky . |
| 820,899 | 5/1906 | Williams . |
| 1,170,162 | 2/1916 | Kellogg . |
| 1,197,297 | 9/1916 | Kellogg . |
| 2,008,024 | 7/1935 | Loose . |
| 2,013,003 | 9/1935 | Loose . |
| 2,421,216 | 5/1947 | Penty . |
| 2,693,419 | 11/1954 | Gager . |
| 2,890,118 | 6/1959 | Cantor et al. . |
| 3,526,513 | 9/1970 | Hyldon . |
| 3,526,514 | 9/1970 | Gralek et al. . |
| 3,787,584 | 1/1974 | Hyldon . |
| 4,004,035 | 1/1977 | Hirzel et al. . |
| 4,143,163 | 3/1979 | Hutchison et al. . |
| 4,496,606 | 1/1985 | Michnowski . |
| 4,501,759 | 2/1985 | Gajewski ................... 426/96 |
| 4,528,202 | 7/1985 | Wang et al. . |
| 4,540,587 | 9/1985 | Gajewski ................... 426/302 |
| 4,551,347 | 11/1985 | Karwowski . |
| 4,696,825 | 9/1987 | Leibfred . |
| 4,734,294 | 3/1988 | Spiel et al. . |
| 4,764,388 | 8/1988 | Sullivan ..................... 426/620 |
| 4,910,031 | 3/1990 | Budd et al. . |
| 5,024,996 | 6/1991 | Ringe ........................ 426/620 |
| 5,133,984 | 7/1992 | Murphy et al. . |
| 5,225,222 | 7/1993 | Cha et al. . |
| 5,258,189 | 11/1993 | Efstathiou ................. 426/620 |
| 5,298,268 | 3/1994 | Maegli . |
| 5,368,870 | 11/1994 | Efstathiou ................. 426/620 |
| 5,407,694 | 4/1995 | Deirne ...................... 426/618 |

OTHER PUBLICATIONS

Atwell, et al., "The Terminology and Methodology Associated With Basic Starch Phenomena", *Cereal Foods World*, vol. 33, No. 3, pp. 306–311 (Mar. 1988).

*Wheat: Chemistry and Technology*, vol. 11, Pomeranz, ed., Amer. Assoc. of Cereal Chemists, Inc., St. Paul, MN, p. 285 (1988).

*Primary Examiner*—Carolyn Paden

[57] ABSTRACT

Reduced fat, low-fat, or no-fat shredded whole grain wafers or biscuits are produced which exhibit a non-gritty smooth or a slippery mouthfeel and glossy appearance even though the fat content is substantially reduced. In embodiments of the invention, at least a substantial portion of the shortening or fat which is topically applied to a baked, shredded product is replaced with a hydrocolloid gum, preferably guar gum. The gum may be incorporated into the product prior to shredding of whole berries or grains. The gum composition, preferably in substantially dry, particulate, or powdered form may be blended with cooked berries or grains to obtain discrete, shreddable, free-flowing gum coated berries or grains. The hydrocolloid gum may be hydrated by the cooked berries or grains upon admixing so as to achieve adhesion of the dry, particulate, or powdered gum to the surface of the grains or berries. The discrete, gum coated berries or grains may be continuously formed into layers of strands or integral net-like sheets which may be continuously laminated. The laminates may be cut to form pieces which are baked to obtain shelf stable wafers or biscuits. Shortening or fat may, for example, be applied to the baked product by spraying in amounts which result in a fat content of less than about 12% by weight.

20 Claims, No Drawings

REDUCED FAT SHREDDED WAFERS AND PROCESS

FIELD OF THE INVENTION

The present invention relates to no-fat, low-fat and reduced-fat whole grain shredded wafers or biscuits and to processes for preparing such whole grain wafers,

BACKGROUND OF THE INVENTION

Shortening or fat is homogeneously incorporated into cookie and cracker doughs to assist machining of the dough and to enhance taste and mouthfeel of the final, baked product. However, in producing shredded products from a whole berry or grain, the homogeneous incorporation of a shortening or fat into the berry would destroy the integrity and discreetness of the berry and thereby impair its shreddability. The application of oil to the surface of the berries may also impair shreddability by creating slippage problems in the shredding mills. Coating berries with oil may also interfere with the ability of the shredding mills to form the berries into a cohesive dough which can be shaped into continuous strands or net-like sheets.

A glossy appearance, lubricous mouthfeel, and desirable color, flavor, and textural attributes provided by shortening or fat is imparted to shredded biscuits or wafers by spraying the baked products with an oleaginous composition. The oleaginous composition may also serve as a carrier for food additives such as flavorants or seasonings. The oil topping may also promote desirable adhesion of the additives to the baked substrate. Relatively high amounts of oil may be topically applied to shredded wafers without creation of surface puddles or oil seepage from the surface. The shredded or net-like, laminated structure of such products allows penetration of the oil to interior shreds and layers which enhances a slippery, lubricous, non-gritty mouthfeel not only during initial mastication but also during subsequent mastication and swallowing.

Carbohydrate gums and hydrocolloids such as xanthan gum, guar gum, locust bean gum, gum arabic, pectin, and carrageenan have been used as thickeners, stabilizers, or emulsifiers in foods. Hydrocolloids are very effective water binding agents. They may be used alone or in combination with other gums or fat substitutes to replace fat.

U.S. Pat. No. 4,551,347 discloses a process of preparing a dry, instant, wheat or farina-like product in flake form which will readily rehydrate upon the addition of hot water. One step in this process involves mixing farina and an effective amount of guar gum in powder form.

U.S. Pat. No. 2,890,118 discloses a method of forming a quick-cooking cereal product. The process includes adding to farina with agitation about ½ to 2½ percent by weight of a thickening and suspending agent. The suspending agent can be gum tragacanth, gum karaya, gum arabic, purified gum guar, agar or refined algin.

U.S. Pat. Nos. 3,526,513 and 3,526,514 disclose the use of guar bean gum as a thickening agent in instant grain products.

U.S. Pat. No. 4,496,606 discloses a ready-to-eat guar gum snack food bar for reducing insulin and permitting smooth blood sugar fluctuations for Type II diabetics.

U.S. Pat. No. 5,133,984 discloses the use of hydrated, polysaccharide hydrocolloids in combination with hydrated insoluble fiber and protein material, in wheat flour-containing doughs and batters for improvement of the functional and/or organoleptic attributes of baked goods produced from such doughs and batters.

The topical application of a hydrocolloid gum, such as guar gum to a baked shredded wafer to replace topically applied fat or shortening can adversely affect the texture, appearance, and microbial stability of the final product. While excess water used as a carrier for the gum may be removed by further heating or drying, these additional steps may decompose or volatilize heat sensitive additives such as vitamins. The additional heating may also increase "checking" or breakage problems in baked goods or adversely affect their flavor, color, appearance or texture. Increasing the concentration of the hydrocolloid gum may result in a viscosity which is too high for proper spraying or too high for penetration to the interior shreds and laminates.

In the present invention, the topically applied fat content of shredded baked goods is substantially reduced without impairing shreddability of whole berries or grains on a continuous, mass production basis. A hydrocolloid gum is incorporated into the product as a fat replacer. However, the discrete, particulate nature and free-flowing non-sticky properties of cooked whole grains needed for the formation of shreds in a shredding mill is not destroyed. The reduced fat, low fat, or no fat baked goods of the present invention exhibit a smooth, lubricous, or slippery mouthfeel during initial mastication as well as subsequent mastication and swallowing.

SUMMARY OF THE INVENTION

In the present invention, no-, low-, or reduced-fat shredded wafers or biscuits are produced using a hydrocolloid gum in an amount which retains the lubricous, slippery, smooth mouthfeel and gloss of shredded products containing substantially greater amounts of shortening or fat. In embodiments of the present invention, the hydrocolloid gum, preferably guar gum, is blended with cooked, tempered whole grain berries or grains prior to shredding. This enables substantial reduction in the amount of post-baking, topically applied shortening or fat. Coating of the berries or grains is achieved without substantial destruction of their individual, discrete, free-flowing form and without a substantial increase in stickiness so as to not adversely affect shreddability. The coated, free flowing berries or grains may be formed or shaped into dough strands or net-like sheets of dough which may be laminated, cut into wafer or biscuit preforms, and then baked.

At least substantially all of the strands or shreds of the wafers or biscuits contain the hydrocolloid gum for enhancing mouthfeel and lubricity throughout the mastication and swallowing of the product. The amount of hydrocolloid gum may range from about 0.15% by weight to about 1.5% by weight, preferably from about 0.25% by weight to about 0.45% by weight, based upon the weight of the berries or grains.

Embodiments of the invention provide wafers of filamentous, shredded whole grain which contain less than about 12 weight percent, preferably less than about 10 weight percent, of fat or shortening, based on the total weight of the baked, finished wafer, and sufficient guar gum to provide a smooth or slippery mouthfeel to the wafer. The amount of shortening or fat topically applied to the baked wafers may be less than about 8% by weight, preferably less than about 6% by weight, based upon the weight of the finished wafer or biscuit.

The wafer or biscuit products of the present invention may be produced by: a) adding a hydrocolloid gum, preferably guar gum in dry, particulate, or powdered form to discrete, cooked berries or grains in an amount to provide a smooth or slippery mouthfeel, as they are being conveyed, b) admixing the gum and berries or grains to at least substantially homogeneously coat the cooked, berries or grains with the gum and to partially hydrate the gum, the admixture of cooked berries or grains and gum being in at least substantially discrete free-flowing form, c) continuously forming the discrete gum coated berries or grains into formed layers of dough strands or integral net-like dough sheets, d) continuously laminating a plurality of the layers of strands or said net-like sheets, e) cutting the dough laminates to form pieces, and f) baking the pieces.

The cooking of the grains or berries may be in the presence of water and/or steam to substantially increase their water content. After draining, the cooked grains or berries may be tempered for a time period sufficient to provide a uniform distribution of the water throughout the cooked grains or berries and then surface dried and cooled. Upon admixture with the gum, the grains or berries may have a shreddable moisture content of about 30% by weight to about 50% by weight, preferably from about 38% by weight to about 47% by weight.

In the present invention, the use of a small amount of a hydrocolloid gum allows the substantial reduction or elimination of added fat or shortening. Incorporation of the gum at least substantially throughout the product is achieved without impairing continuous shreddability in shredding mills. The gum incorporation also provides a non-gritty, lubricous mouthfeel during initial mastication as well as during subsequent mastication and swallowing in spite of the major reduction or elimination of shortening or fat.

DETAILED DESCRIPTION OF THE INVENTION

The present invention provides reduced fat, low fat, or no-fat shredded wafers or biscuits which exhibit the smooth mouthfeel and glossy appearance of shredded products containing substantial amounts of shortening or fat. In embodiments of the present invention, the amount of post-baking topically applied shortening or fat is reduced by the incorporation of a hydrocolloid gum prior to shredding to retain a slippery mouthfeel and glossy appearance. Coating of the individual berries or grains with the hydrocolloid gum after cooking and tempering serves to incorporate it into and onto the individual shreds, strands, or net-like dough sheets produced by the shredding rolls. Thus, a lubricous, non-gritty, smooth mouthfeel is provided upon initial mastication as well as during consumption and swallowing of the baked product. Admixture of the hydrocolloid gum with the individual, discrete, free-flowing whole berries or grains after cooking and tempering avoids excessive stickiness and permits shreddability on a continuous, mass production basis.

In respect to the use of the term "mouthfeel" herein, it will be appreciated that such relates generally to a group of tactile, feeling sensations which, while common to the body as a whole, are particularly acutely perceived in the lingual, buccal and esophageal mucosal membranes. The term "mouthfeel" as used herein includes reference to one of the above-mentioned group of sensations associated with the tactile perception of fineness, coarseness and greasiness. This tactile impression is generally appreciated in the mouth proper wherein subtle differences between various foods are most readily perceived.

As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers, or biscuits or wafers, used as snacks, and for cookies, the reference amount is 30 grams. Thus, the fat content of a low-fat cracker, wafer, or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product. A no-fat wafer having a label serving size of 32 grams would have a fat content of less than 0.5 grams per 32 grams or less than about 1.56% by weight, based upon the weight of the final product.

Shortening or fat which may be used in producing reduced fat or low fat shredded wafers or biscuits in accordance with the present invention may be any edible fat or oil or mixture thereof suitable for baking applications and may include conventional food-grade emulsifiers. Vegetable oils, lard, marine oils, and mixtures thereof which are fractionated, partially hydrogenated, and/or interesterified are exemplary of the shortenings or fats which may be used in the present invention. Oils which may be sprayed onto the baked, shredded products include partially hydrogenated soybean oil, palm oil and mixtures thereof.

In embodiments of the invention, the amount of vegetable shortening or fat topically applied to shredded products may be reduced by more than 25 percent by weight to obtain reduced fat products having, for example, less than about 12 weight percent fat, preferably less than 10% by weight fat, based on the total weight of the baked, finished product.

In the present invention, a hydrocolloid gum alone or in combination with reduced amounts of topically applied shortening or fat, provides shredded wafers or biscuits with a smooth or slippery, lubricous mouthfeel. The hydrocolloid gum substantially reduces or eliminates dryness and sticking of the shredded biscuits in the mouth or throat and makes it easier to swallow the masticated biscuit pieces as the amount of shortening or fat is reduced. The hydrocolloid gum used in the present invention should provide lubricity, without a lumpy or stringy, viscous mouthfeel. In addition, the hydrocolloid gum should be capable of adhering to the individual discrete grains or berries without interfering with the shreddability of the coated, discrete, free flowing grains or berries.

In preferred embodiments of the present invention, guar gum is the preferred hydrocolloid gum for replacing shortening or fat. Guar gum is obtained from the seeds of the leguminous plant Cyamopsis tetragonolobus. The seeds after harvesting, are processed by dehulling and milling. In such process the gum-containing fractions are enriched by differential milling. The final form of the gum is a fine powder which contains about 80 percent guar glactomannan. Guar gum is a straight chain polymer of D-mannopyranose with one unit length D-galactopyranose substituents on every second mannopyranose unit. The molecular weight of guar gum is in the range of 200,000 to 2,000,000. Guar gum hydrates easily in cold water and yields highly viscous colloidal solutions. It is insoluble in oils, alcohol, benzene and other organic solvents.

Edible grades of guar gum are used in the invention compositions. Guar gum powder provides a free flowing powder which is completely soluble in cold and hot water. Water solutions of guar gum are tasteless, odorless and nontoxic. Aqueous dispersions of guar gum are neutral. The average particle size of the guar gum which may be used in the present invention may range from about 140 to about 200 U.S. mesh, preferably from about 160 mesh to about 180 mesh.

The guar gum is preferably used alone but may also be used in combination with other hydrocolloid gums. Exemplary hydrocolloid gums which may be used in the present invention are other non-gelling gums such as xanthan gum and carboxymethyl cellulose, and gums which form gels such as alginate gum, carrageenan gum, gum arabic, gum tragacanth, pectin, and locust bean gum, and mixtures thereof.

The hydrocolloid gums are used in effective amounts which provide a lubricous, smooth, non-slippery mouthfeel to the baked product. Exemplary amounts of the hydrocolloid gum, preferably guar gum, which may be used range from about 0.15% by weight to about 1.5% by weight, preferably from about 0.25% by weight to about 0.45% by weight, based upon the total weight of the whole berries or grains. Generally, the greater the extent of shortening or fat reduction, the greater the amount of gum utilized to compensate for the loss of lubricity or loss of smoothness in mouthfeel. Excessive amounts of the hydrocolloid gum, for example above about 2% by weight, tend to result in a more lumpy, stringy or viscous mouthfeel and may adversely affect shreddability.

Various grains may be used in the context of this invention. Examples of suitable grains include wheat, oats, barley, rye, corn and mixtures thereof. In the preferred embodiment whole grain soft wheat or whole wheat berries are used. In embodiments of the invention, whole grains, which are at least partially or fully defatted, such as defatted whole wheat berries, may be used alone or in admixture with full-fatted whole grains.

The cooking of the grain or berry according to this invention can be done in any standard cooking equipment, such as a rotary cooker. The grain may be cooked at temperatures and humidities which hydrate and gelatinize the internal structure of the grains or berries such that only a pin head of white or free starch remains visible in the center of the kernel. In embodiments of the invention, the degree of gelatinization may for example, be at least 90%. The degree of starch gelatinization may be measured by differential scanning calorimetry (DSC). Generally, starch gelatinization occurs when: a) water in a sufficient amount, generally at least about 25 to 30% by weight, based upon the weight of the starch, is added to and mixed with starch and, b) the temperature of the starch-water mixture is raised to at least about 80° C. (176° F.), preferably 100° C. (212° F.) or more. The gelatinization temperature depends upon the amount of water available for reaction with the starch. The lower the amount of available water, generally, the higher the gelatinization temperature. Gelatinization may be defined as the collapse (disruption) of molecular order within the starch granule, manifested in irreversible changes in properties such as granular swelling, native-crystallite melting, loss of birefringence, and starch solubilization. The point of the initial stage of gelatinization and the range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granule. See Atwell et al, "The Terminology And Methodology Associated With Basic Starch Phenomena," *Cereal Foods World*, Vol. 33, No. 3, Pgs. 306–311 (March 1988).

Exemplary cooking temperatures may range from about 190° F. to about 212° F. Cooking of the wheat grain in the preferred embodiment occurs at about 210° F. at atmospheric pressure using steam for about 30 to about 36 minutes. The cooking can include a "come-up time" of between 6.5 to about 8 minutes during which the temperature of the grain in the vat or cooking vessel is elevated from ambient temperature to the cooking temperature. But preferably, before cooking, the wheat grains are added to hot water at a temperature of about 170° to 190° F. in the cooker. The wheat grains may added to the hot water in a rotating cooker, for example, over a time period of about 50 to about 100 seconds. The amount of water used in the cooking step may range from about 40% by weight to about 70% by weight based upon the total weight of the grains or berries and added water. The moisture content of the cooked grain, after draining may range from about 35% by weight to about 60% by weight. Similar cooking parameters may be used with other grains and grain mixtures.

During cooking, moisture tends to collect on the grain particles or berries. This moisture can increase the stickiness of the cooked grain and can cause handling problems when the grain is transferred to other apparatus. Mixing the grain in the cooking vat at low rotation speeds provides for even cooking and reduces lumping.

After draining of the excess cooking water and steam condensate formed during cooking, the cooked whole berries or grains may be discharged from the rotating cooker and transferred to a surface dryer and cooler. The cooked berries or grains may be dried and cooled to a temperature of less than about 85° F., preferably to a temperature of about 60° F. to about 80° F. The surface drying and cooling facilitates flow of the cooked grains as individual, discrete pieces. The dried, cooled grains or berries may have a moisture content of about 30% by weight to about 50% by weight, preferably from about 38% by weight to about 47% by weight for shreddability into strong, continuous shreds.

The cooked grains or berries may then be tempered or cured for a sufficient period of time to provide a uniform distribution of the water throughout the cooked whole grains. Tempering may be conducted at about 60° to 85° F. for about 12 to 16 hours. The tempering or curing step may be accomplished in one or more stages.

The hydrocolloid gum, preferably guar gum, in dry, particulate, or powdered form may be admixed or blended with the cooked, tempered, discrete grains or berries preferably at temperatures of about 60° F. to about 85° F. Batch or continuous mixers or blenders can be used to mix the gum and the cooked, tempered grains or berries to coat them with the gum substantially homogeneously. The ingredients are mixed so as to substantially retain berry or grain integrity and discreteness and an individual, free-flowing form.

Preferably dry, particulate, or powdered gum is added to the cooked, tempered grains or berries because the addition of dilute or highly solubilized gum tends to make the grains or berries too sticky to shred. The added gum may contain water in an amount which does not adversely affect berry discreteness or flowability for shredding. Generally, the water content of the gum composition admixed with the tempered berries or grains may be less than about 25% by weight, preferably less than about 15% by weight. The dry gum sticks or adheres to the cooked, tempered grains, thus at least partially coating the grains without creating a sticky surface which would hamper or interfere with shredding. The gum sticks to the grains or berries because the tempered grains or berries contain sufficient water, for example, about 30 to about 50 percent water to at least partially hydrate the particulate or powdered, dry gum. Upon shredding of the grains or berries, the gum coating or particles are incorporated into and onto the individual strands or net-like sheets of dough formed by the shredding rolls.

The cooked and tempered gum coated grains may be transferred by means of belt conveyors and/or bucket elevators to a hopper which feeds a screw conveyor. The latter may transfer the grain to a series of shredding rolls or mills via flow tubes or hoppers. An example of such a screw conveyor is that made by the Screw Conveyor Corporation, 704 Hoffman Street, Hammond, Ind. 46327. Suitable moisture contents of the grains for shredding may range from about 30 to about 50 percent, preferably from about 38 to about 47 percent by weight, based upon the weight of the grains.

Any conventional milling system can be used in the present invention. A conventional milling system for use in embodiments of the invention for making a wafer or biscuit can comprise a pair of closely spaced rolls that rotate in opposite directions with at least one of the rolls having circumferential grooves. Upon passing between the rolls, the dough is formed into long individual strings or strands. A circumferentially grooved roll can also be grooved transversely to the circumferential grooves for the production of a net-like sheet. When sheets are formed, the sheets are comprised of interwoven shreds or strings. When the rolls are held tightly together, the shreds or filaments partially separate frown each other but are more or less connected. When the rolls are sprung slightly apart under pressure, the adjacent filaments can be united to each other by very thin webs or fins which stretch between them.

Upon passing between the rolls, the dough is deformed into the circumferential grooves and the optional crosshatching grooves. Each pair of rolls produces a dough layer having a plurality of generally parallel longitudinal strands and optionally a plurality of crosshatchings generally perpendicular to the strands. The crosshatchings and the longitudinal strands form an integral net-like sheet. The texture of each layer may be controlled by the number of crosshatchings in each layer forming the net-like sheets. The net-like sheets are preferably unwebbed or webless, i.e., the crosshatchings and longitudinal strands of each layer are not connected by a membrane. The use of an open space within the area formed by the longitudinal strands and the crosshatchings in the outer layers provides a more attractive product. Additionally, use of the open space in the inner layers avoids an excessively dense texture.

The longitudinal strands are produced by the circumferential grooves and may run in parallel with the direction of movement of an underlying conveyor. The crosshatchings of the dough layer are produced by the crosshatching grooves and may run generally perpendicular to the direction of movement of the conveyor.

The shredding mills may be arranged in a linear series along the common underlying conveyor. Each of the shredded dough layers or sheets may be deposited on the conveyor in super-position, with their longitudinal strands running in the same direction.

Conventional shredding systems which can be used in the process of the present invention are disclosed in U.S. Pat. Nos. 502,378; 2,008,024; 2,013,003; 2,693,419; 4,004,035; and Canadian Pat. No. 674,046.

The first and last one or more shredded dough layers to be deposited or laminated may have a number of crosshatchings so as to provide a region of lighter texture or lower density or more openness in the wafer so as to permit penetration of any topping oil into the inner layers. The first layer which is laid down upon the conveyor belt however, preferably has a sufficient number of crosshatchings to provide a more stable bed for the depositing of subsequent shred layers. AdditiOnally, the outside appearance of the product is enhanced by the presence of crosshatchings as is the initial impression of crispness upon eating. For a 5 inch diameter shredding roll, the number of crosshatchings may be about 45 or more, equally spaced about the roll. Five inch diameter rolls may generally have: (1) about 18 to 22 circumferential grooves per inch, and (2) up to about 120 equally spaced crosshatching grooves. Larger or smaller diameter rolls may also be used with about the same frequency of grooves as the five inch diameter rolls.

The dough layers which are deposited between the outer layers providing a lighter texture or lower density may have an increased number of crosshatchings so as to provide a region of denser texture or higher density in the interior of the biscuit and enhanced crispness and strength. The number of crosshatchings in each layer which provides the region of denser texture or higher density may be the same or different.

In embodiments of the invention, at least 30 percent of the total number of net-like sheets may provide one or more regions of dense texture or higher density. Generally, the total number of net-like sheets may range from about six to about 21, with the larger number of sheets being reserved for the larger sized wafers. The wafers of the invention preferably have from about 8 to about 12 net-like sheets.

The laminates of shredded dough strands, layers or net-like sheets may then be cut, slit and dockered using conventional equipment. The cutting operation may partially or completely cut the sheets into strips. The slitting operation may completely cut or score the strips so as to provide scored strips of wafers with the wafers tenuously connected to each other. After baking and before or after the oil addition to the strips, the conveyor movement, etc., breaks apart the scored wafer strips to provide individual wafers. The dockering operation may provide rows of indentations on each side of the wafers (in strip form) without completely penetrating through the wafers.

The wafers or biscuits may be dried, baked and toasted in conventional equipment. Suitable ovens for drying, baking and toasting the cut laminate include Proctor & Schwartz, Werner-Lehara, Wolverine and spooner ovens containing forced air and gas fired burners and a conveyor. Preferably the wafers are toasted because toasting enhances the flavor of the wafers and browns the edges of the wafers.

Temperature profiles used in the oven for drying, baking and toasting of the biscuit preforms may generally be within the range of about 200° to about 600° F. The baking is preferably done in a zoned oven having an average temperature of about 500° F. based on all of the zone temperatures. The total time for drying, baking and toasting may be such so as to avoid browning (except on the edges of the wafers). It depends upon the number of shred layers, the size of the shredded product and the type of oven. The total time for drying, baking and toasting may range from about 3 minutes to about 10 minutes.

The color of the final baked product can be a substantially uniform off-white to golden tan color. The product may be topped with salt (for example, 0.5 to 2 weight percent, based on the total product weight) prior to baking. The salt provides flavor and flavor enhancement. Some of the salt (NaCl) can be replaced with KCl or other salt substitutes.

The fat or shortening, when used in embodiments of the invention can be applied, preferably by spraying in oil form, to the top and bottom surfaces of baked wafers having no added fat or having only fat inherent in the cereal grain. Generally, whole wheat berries have an inherent fat content of about 2% to 4% by weight. See, Wheat: *Chemistry and Technology*, Vol. II, Pomeranz, ed., Amer. Assoc. of Cereal Chemists, Inc., St. Paul, Minn., p. 285 (1988). In embodiments of the invention, the topical application of oil to baked wafers having no other added fat may result in baked products having a total fat content of less than about 12%, preferably less than about 10% by weight. In preferred embodiments the amount of topically applied oil may be less than about 8% by weight, most preferably less than about 6% by weight, based upon the weight of the biscuit or wafer. The hydrocolloid gum allows the use of even no added fat to obtain a slippery or smooth mouthfeel and a glossy appearance.

The wafers may contain one or more additives (e.g., vitamins, minerals, colorants, flavorants, etc.) at effective levels of concentration. Exemplary thereof are sugars such as sucrose, fructose, lactose, dextrose, and honey, polydextrose, dietary fiber, seasonings, malt, wheat germ, nuts, cocoa, flavorants such as fruit flavoring, cracker flavoring, cinnamon, and vanilla flavoring, acidulants such as citric acid and lactic acid, preservatives such as TBHQ, antioxidants such as tocopherol and BHT, food colorant, emulsifiers such as Myvatex® (a blend of distilled monoglycerides manufactured by Eastman Kodak), sodium stearoyl lactylate, lecithin, and polysorbate 60, and vitamins and/or minerals. Examples of suitable vitamins and minerals include B-complex vitamins, soluble iron compounds, calcium sources such as calcium carbonate, vitamin A, vitamin E, and vitamin C. Also, non-fat dry milk solids (i.e., milk powder) or soybean protein may be added in an amount sufficient to create a final protein level of from about 10 to about 20 weight percent. Such additional ingredients may range up to about 30 weight percent, based on the total dry weight of the final product.

The additives, such as vitamins and minerals, may be dry blended with the hydrocolloid gum and then the dry blend may be admixed with the cooked, tempered wheat berries. In other embodiments, enrichment with vitamins and minerals and/or other additives may be achieved by blending with the blended grain and gum mixture. For example, a dry multi-vitamin premix may be added with simultaneous mixing to the gum coated grain mixture at the entry of a screw conveyor to form a homogeneous composition.

The resulting composition may be fed or dropped into a hopper, which supplies milling rolls. The multi-vitamin and gum coated grain composition may then be milled and formed into biscuits.

Additives or fillings, particularly those which may adversely affect shredding, may also be incorporated into the shredded baked goods of the present invention by depositing them between shred layers during formation of the dough laminate. Sucrose, fructose, lactose, dextrose, polydextrose, fiber, milk powder, cocoa, and flavorants are exemplary of additives which may be deposited. Exemplary fillings for inter-shred layer deposition include fruit paste fillings, no-fat cheese powder fillings, confectionery fillings, and the like. No-fat, reduced fat and low-fat additives and fillings are preferred.

Additives may also be topically applied to the laminated structure before or after baking. The topically applied oil may be used as a carrier for one or more additives, such as flavorants or seasonings.

Products of the present invention may have a moisture content of less than about 5% by weight, preferably about 0.5 to about 3 weight percent, more preferably about 1 to 2 weight percent, based on the total weight of the baked, finished product. The final product may be baked to a shelf stable relative humidity or "water activity" of less than about 0.7, preferably less than about 0.6. It may have a shelf stability of at least about 2 months, preferably at least about 6 months, when stored in proper, sealed packaging.

The following examples further illustrate the present invention wherein all parts and percentages are by weight and all temperatures are in ° F., unless otherwise indicated:

EXAMPLE 1

The ingredients and their relative amounts which may be used to produce a shredded wheat wafer having a lubricous, smooth mouthfeel and its fat content reduced by about 40% by weight are:

| Ingredient | Relative Amount By Weight |
| --- | --- |
| soft white wheat berries (about 13% by weight water, and about 2.75% by weight fat) | 100 |
| water | 136 |
| soybean oil, partially hydrogenated | 5.7 |
| salt | 1.3 |
| guar gum (about 13% by weight water) | 0.35 |
| Total | 243.35 |

Water at a temperature of about 170° F.–190° F. may be added to a rotary cooker. Then, the soft white wheat (whole grain) may be added to the rotating cooker within about 60–70 seconds. The mass in the cooker may then be heated with steam and cooked for about 30 to 36 minutes at 210° F. or until a pinhead of white remains visible in the kernel. The cooked mass in the cooker may then be drained for about 6 to 12 minutes. The cooked, drained wheat berries may then be discharged from the rotating cooker to a surface dryer and cooler. The wheat berries may be cooled about 30 minutes to a temperature of less than about 80° F. The cooled wheat berries may then be conveyed to curing (tempering) tanks. After 6 to 8 hours of curing, the wheat berries may be transferred to a second stage tank for an additional 6 to 8 hours of curing or tempering. The tempered wheat berries may have a moisture content of about 44 percent by weight for shredding.

The discrete, free flowing wheat berries may then be conveyed pneumatically to a cyclone receiver located above a Thayer weigh scale. The guar gum may be separately transferred to a hopper above a screw driven particulate feeder. The cured wheat berry feeder and the guar gum feeder may be simultaneously started to feed each of the ingredients to a continuous blender. In the continuous blender, the wheat berries and dry guar gum may be admixed so as to coat the wheat berries substantially homogeneously with the guar gum while substantially retaining berry discreteness.

The final blend may be conveyed via a bucket elevator to a surge hopper for feeding to eight shredding mills which are arranged in a linear series along a common conveyor. Each shredding mill may comprise a pair of counterrotating rolls held in mutual contact for the production of net-like sheets. The rolls of five of the eight mills may have 60 cross-hatching grooves. Three internal layers (e.g., layer numbers 3, 4 and 5) may be made using shredders with rolls having 120 cross-hatching grooves.

The net-like cereal dough sheets produced by the shredding mills may be deposited upon the conveyor to form an eight layer laminate. The laminate may be cut or scored, slit and dockered to form strips of scored wafer dough preforms. The salt may be deposited upon the preforms by gravimetric salters.

The salted product may be transferred to a multizone band oven for drying, baking and toasting for about 5 to 7.5 minutes at temperatures ranging from about 200° F. to about 600° F. The baked product leaving the oven may have an end point moisture content of about 1.75% by weight, based upon the weight of the final product.

As the baked product strips exit the oven, the soybean oil may be topically applied as a fine spray to the top and bottom of the baked wafer preform strips.

The baked preform strips may then be conveyed to packaging in a manner so that the scored strips of wafers readily separate at the score line by motion, bumping, etc., into individual wafers. The wafers may be about 1⅞" long, 1¾" wide, and 3/16" thick. The spray oil content of the wafers may range from about 4.5% by weight to about 7.5% by weight and average about 6.0% by weight. The total fat content of the wafers may range from about 7.25% by weight to about 10.25% by weight and average about 8.75% by weight.

EXAMPLE 2

The ingredients which may be used to produce a no-fat shredded wheat filled wafer having a fat content of less than about 1.56% by weight and a smooth, lubricous mouthfeel are:

| Ingredient | Relative Amount By Weight |
| --- | --- |
| wheat berries (about 13% by weight water and about 2% by weight fat) | 100 |
| water | 136 |
| salt | 2.2 |
| guar gum (about 13% by weight water) | 0.35 |
| no-fat fruit filling | 42 |
| Total | 280.55 |

The shredded wafer may be prepared as in Example 1 except the fruit filling may be deposited between shred layers 3 and 4 and the oil spraying step is eliminated.

EXAMPLE 3

A low-fat shredded wheat wafer may be produced using the ingredients and procedure of Example 1 except the relative amount of oil used for topical application to the baked product may be reduced so that the total fat content of the wafers range from 3% by weight to 6% by weight.

EXAMPLE 4

A reduced fat shredded wheat biscuit having its fat content reduced by about 50% by weight may be produced using the ingredients and procedure of Example 1 except the relative amount of oil used for topical application to the baked product may be reduced from 5.7 parts by weight to 4.3 parts by weight.

What is claimed is:

1. A reduced-, low- or no-fat wafer comprising a plurality of laminated net-like sheets comprising filamentous, shredded whole grain and from about 0.15% by weight to about 1.5% by weight of at least one hydrocolloid gum incorporated into and onto each of said sheets by coating said whole grain with said at least one hydrocolloid prior to shredding, wherein at least substantially all of the strands or shreds of the wafers contain said at least one hydrocolloid gum to provide a smooth or slippery mouthfeel and enhanced lubricity to the wafer throughout the mastication and swallowing of the wafer.

2. The whole grain wafer of claim 1 wherein the at least one hydrocolloid gum is guar gum in an amount of about 0.25% by weight to about 0.45% by weight, based on the total weight of the grain.

3. The whole grain wafer of claim 2 wherein said grains comprise whole wheat berries.

4. The whole grain wafer of claim 3 wherein a plurality of outer net-like sheets are lighter in texture than a plurality of inner net-like sheets so as to permit penetration of topically applied oil to the inner layers.

5. The whole grain wafer of claim 3 wherein the number of net-like sheets is from 8 to 12.

6. A method for substantially reducing the topically applied shortening or fat content of shredded baked goods without impairing shreddability of whole berries or grains on a continuous, mass production basis comprising replacing at least a substantial portion of the shortening or fat which is topically applied to the baked, shredded product with at least one hydrocolloid gum, said gum providing a lubricous mouthfeel to the baked product and being incorporated into the product prior to shredding of the whole berries or grains by blending the gum with cooked berries or grains to obtain discrete, individual, free-flowing gum coated berries or grains, forming the coated berries or grains into strands or net-like sheets in a shredding mill, baking the strands or sheets to obtain baked goods which exhibit a smooth, lubricous, or slippery mouthfeel during initial mastication as well as subsequent mastication and swallowing.

7. A method as claimed in claim 6 wherein said hydrocolloid gum comprises guar gum.

8. A method as claimed in claim 7 wherein said cooked whole berries or grain are tempered and then admixed with said hydrocolloid gum, said gum being in dry or powdered form.

9. A method of making a reduced fat, low-fat or no-fat wafer or biscuit product, said method comprising:
(a) cooking berries or grains and then admixing at least one hydrocolloid gum with the cooked berries or grains in an amount of from about 0.15% by weight to about 1.5% by weight, based upon the weight of the berries or grains to provide a smooth or slippery mouthfeel to the wafer or biscuit product and to coat said cooked, berries or grains, the gum coated, cooked, berries or grains being in discrete, free-flowing form, (b) forming the discrete gum coated berries or grains into layers of strands or integral net-like sheets, and continuously laminating a plurality of said layers of strands or said net-like sheets to obtain laminates, (c) cutting the laminates to form pieces, and (d) baking the pieces to form wafers or biscuits.

10. The method of claim 9 wherein the berries or grains are cooked in water or steam, the cooked berries or grains are drained, surface dried and cooled to obtain a moisture content of the berries or grains between about 30% by weight and about 50 weight percent.

11. The method of claim 10 wherein the cooked berries or grains are tempered for a time period sufficient to provide a uniform distribution of the water throughout the cooked berries or grains.

12. The method of claim 11 wherein the cooked berries or grains are whole wheat berries, and said berries are tempered at about 60° F. to about 85° F. for about 12 to about 16 hours.

13. The method as claimed in claim 9 wherein the hydrocolloid gum is used in an amount of about 0.25 to about 0.45 weight percent, based on the total weight of the berries or grains.

14. The method as claimed in claim 9 wherein the hydrocolloid gum admixed with said berries or grains comprises guar gum in dry, particulate, or powder form.

15. The method as claimed in claim 9 wherein said pieces are dockered before being baked.

16. The method as claimed in claim 9 wherein said pieces are baked to a moisture content of about 0.5% by weight to about 3% by weight.

17. The method as claimed in claim 9 wherein fat or shortening in the amount of less than about 8 weight percent, based on the weight of said wafer or biscuit, is applied after said baking.

18. The method as claimed in claim 9 wherein the hydrocolloid gum is hydrated by said berries or grains upon said admixing.

19. A method for producing reduced fat, low fat, or no fat shredded wafers or biscuits comprising:

(a) admixing guar gum with cooked berries or grains in an amount effective to provide a smooth or slippery mouthfeel to the wafer or biscuit product without substantial destruction of the discrete, free-flowing form of the cooked berries or grains, (b) forming the discrete berries or grains into layers of strands or integral net-like sheets wherein at least substantially all of the strands or sheets contain the guar gum for providing said mouthfeel, and continuously laminating a plurality of said layers of strands or said net-like sheets to obtain laminates, (c) cutting the laminates to form pieces, and (d) baking the pieces to form wafers or biscuits.

20. A method as claimed in claim 19 wherein the berries or grains comprise defatted grains for producing no-fat shredded wafers or biscuits.

* * * * *